United States Patent
Sakurai et al.

(10) Patent No.: US 9,684,275 B2
(45) Date of Patent: Jun. 20, 2017

(54) IMAGE FORMING APPARATUS HAVING MESHED DRIVING FORCE CONNECTIONS

(71) Applicant: FUJI XEROX CO., LTD., Tokyo (JP)

(72) Inventors: Masami Sakurai, Kanagawa (JP); Jun Kawai, Kanagawa (JP); Takayuki Kondo, Kanagawa (JP); Zentaro Nemoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/049,223

(22) Filed: Feb. 22, 2016

(65) Prior Publication Data

US 2017/0017192 A1    Jan. 19, 2017

(30) Foreign Application Priority Data

Jul. 17, 2015   (JP) .................................. 2015-143018

(51) Int. Cl.
*F16D 1/10* (2006.01)
*G03G 15/00* (2006.01)
*F16D 1/06* (2006.01)

(52) U.S. Cl.
CPC ............. *G03G 15/757* (2013.01); *F16D 1/06* (2013.01); *F16D 1/10* (2013.01); *F16D 2001/103* (2013.01)

(58) Field of Classification Search
CPC ..................................... F16D 1/06; F16D 1/10
See application file for complete search history.

(56) References Cited

U.S. PATENT DOCUMENTS 6,157,799 A * 12/2000 Asakura ............... G03G 21/186
399/121
2006/0260902 A1   11/2006 Marumoto et al.

FOREIGN PATENT DOCUMENTS

| JP | 2000-227690 A | 8/2000 |
| JP | 2006-350285 A | 12/2006 |
| JP | 2012-83441 A | 4/2012 |

* cited by examiner

*Primary Examiner* — Clayton E LaBalle
*Assistant Examiner* — Victor Verbitsky
(74) *Attorney, Agent, or Firm* — Sughrue Mion, PLLC

(57) ABSTRACT

An image forming apparatus includes an output gear that is driven by a drive source, a transmitting member that meshes with the output gear in such a manner as to be capable of advancing toward and retracting from a driving object and transmits a rotational driving force to the driving object, a guiding portion provided coaxially with the output gear and that guides the transmitting member in a direction of advancement or retraction of the transmitting member, and a locking member provided between the output gear and the transmitting member and that limits a movement of the transmitting member from a side of the output gear toward the driving object.

8 Claims, 4 Drawing Sheets

IMAGE FORMING APPARATUS HAVING MESHED DRIVING FORCE CONNECTIONS

CROSS-REFERENCE TO RELATED APPLICATIONS

This application is based on and claims priority under 35 USC 119 from Japanese Patent Application No. 2015-143018 filed Jul. 17, 2015.

BACKGROUND

Technical Field

The present invention relates to an image forming apparatus.

SUMMARY

According to an aspect of the invention, there is provided an image forming apparatus including an output gear that is driven by a drive source, a transmitting member that meshes with the output gear in such a manner as to be capable of advancing toward and retracting from a driving object and transmits a rotational driving force to the driving object, a guiding portion provided coaxially with the output gear and that guides the transmitting member in a direction of advancement or retraction of the transmitting member, and a locking member provided between the output gear and the transmitting member and that limits a movement of the transmitting member from a side of the output gear toward the driving object.

BRIEF DESCRIPTION OF THE DRAWINGS

An exemplary embodiment of the present invention will be described in detail based on the following figures, wherein.

DETAILED DESCRIPTION

The drawings to be referred to in the following description are only schematic, and elements illustrated therein are not necessarily drawn to scale. For easy understanding of the following description, irrelevant elements are not illustrated.

Furthermore, directions in each of the drawings are defined as follows: the front-rear direction corresponds to the X-axis direction, the left-right direction corresponds to the Y-axis direction, and the top-bottom direction corresponds to the Z-axis direction.

(1) Overall Configuration and Operation of Image Forming Apparatus

Figure 1:
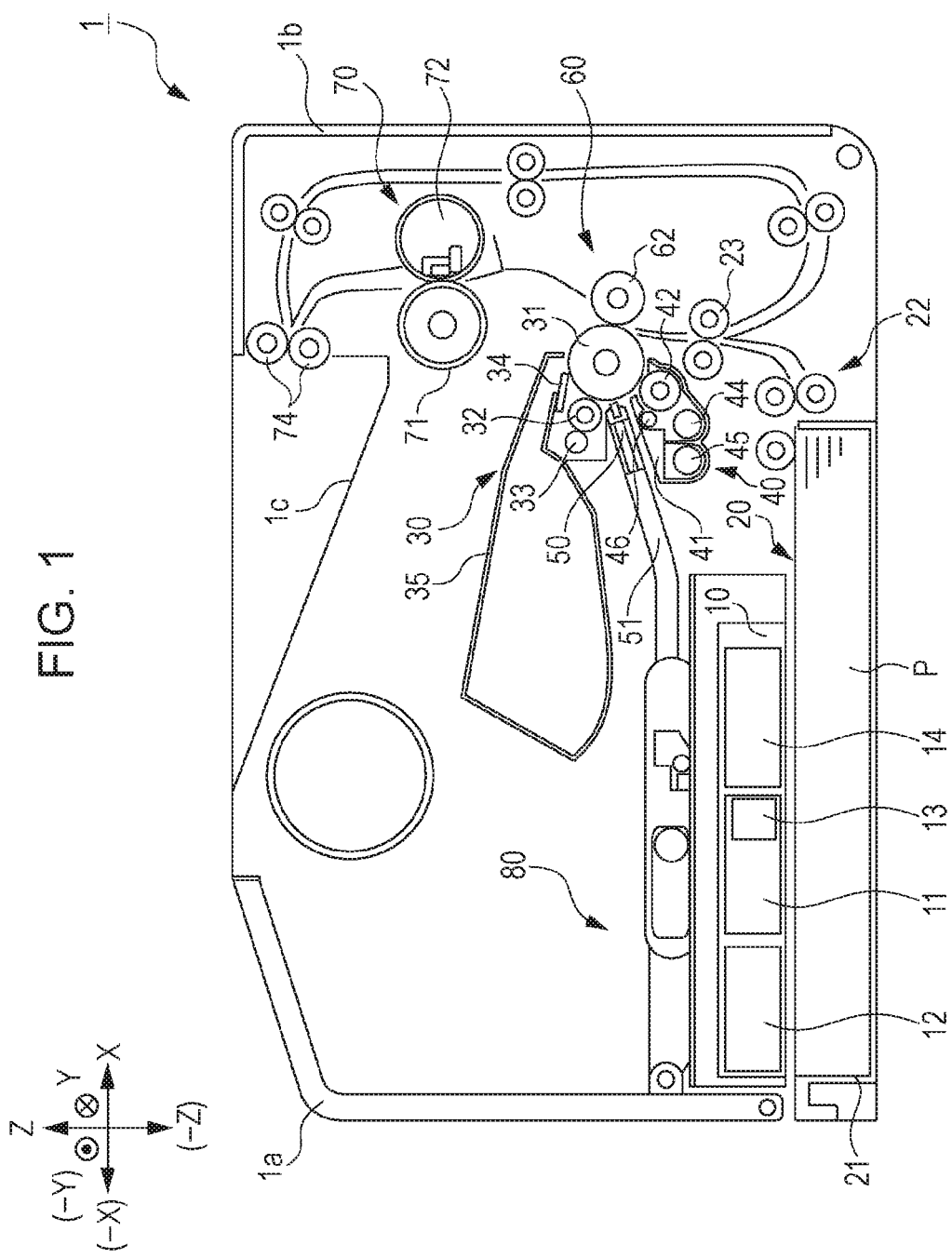
FIG. 1 is a schematic vertical sectional view of an image forming apparatus according to the exemplary embodiment and illustrates an internal configuration thereof.

FIG. 1 is a schematic vertical sectional view of an image forming apparatus 1 according to the present exemplary embodiment and illustrates an internal configuration thereof.

The overall configuration and operation of the image forming apparatus 1 will now be described with reference to FIG. 1.

Figure 2:
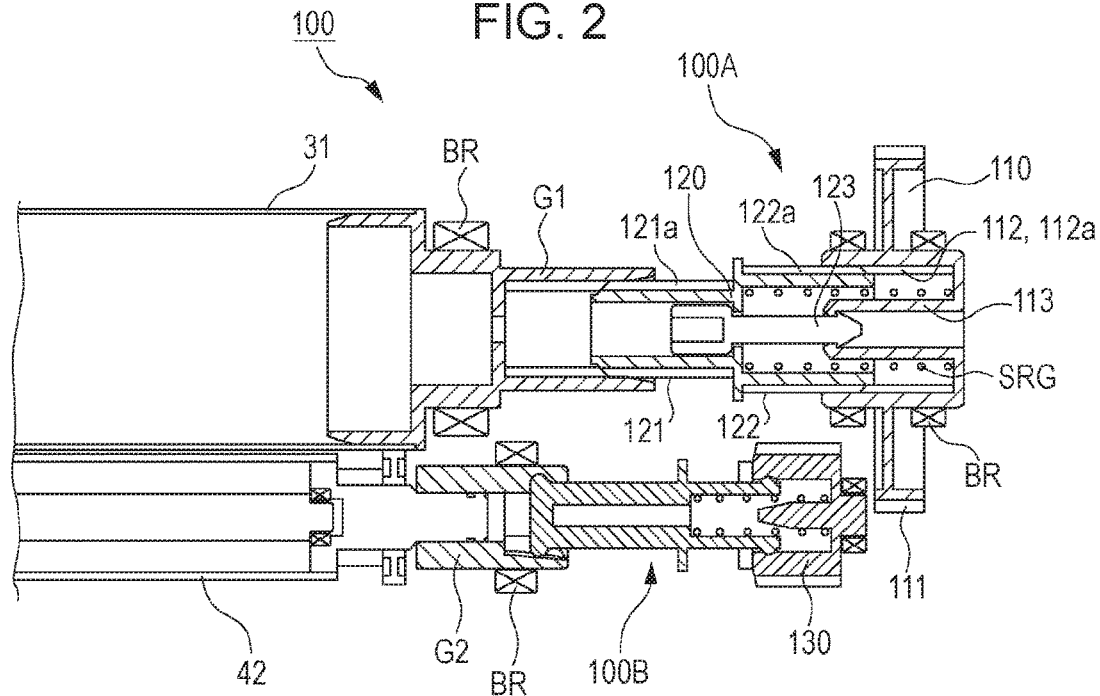
FIG. 2 is a schematic sectional view of a coupling mechanism that transmits rotational driving forces to a photoconductor drum and to a developing roller.

The image forming apparatus 1 includes a control device 10, a sheet transporting device 20, a photoconductor unit 30, a developing device 40, an exposure device 50, a transfer device 60, a fixing device 70, a retracting mechanism 80, and a coupling mechanism 100 (see FIG. 2).

The image forming apparatus 1 further includes an openable/closable covering 1a rotatably supported on the front face thereof. To replace any elements such as consumables with new ones, the openable/closable covering 1a is opened frontward (in the −X direction) so that the inside of the image forming apparatus 1 is exposed.

The image forming apparatus 1 further includes a rear covering 1b rotatably supported on the rear face thereof. If a sheet jam occurs or if internal inspection or the like is conducted, the rear covering 1b is opened so that the inside of the image forming apparatus 1 is exposed.

The image forming apparatus 1 further includes an upper covering 1c provided at the top thereof (on the Z side). The upper covering 1c also serves as an output tray onto which a sheet having an image recorded thereon is discharged and received.

The control device 10 includes an image-forming-apparatus controller 11 that controls the operation of the image forming apparatus 1, a controller unit 12 that prepares image data corresponding to a printing request, an exposure controller 13 that controls the turning on/off of a light source included in the exposure device 50, and a power supply device 14. The power supply device 14 applies voltages to elements such as a charging roller 32, a developing roller 42, and a transfer roller 62 that are to be described later. Furthermore, the power supply device 14 supplies power to the exposure device 50.

The controller unit 12 converts image data inputted thereto from an image reading device (not illustrated) or printing information inputted thereto from an external information-transmitting apparatus (such as a personal computer) into image information intended for latent image formation, and outputs a driving signal to the exposure controller 13 at a predetermined timing.

The sheet transporting device 20 is provided at the bottom of the image forming apparatus 1. The sheet transporting device 20 includes a sheet cassette 21. A number of sheets P as recording media are stacked on the sheet cassette 21 and are positioned widthwise by a regulating plate (not illustrated). The sheets P are picked up rearward (in the X direction) one by one from the top of the stack by a sheet pickup unit 22. Each of the sheets P is then transported to a nip between a pair of registration rollers 23.

The photoconductor unit 30 is provided above the sheet transporting device 20 and includes a photoconductor drum 31 provided in a unit housing 35. The photoconductor drum 31 rotates when driven via the coupling mechanism 100 (see FIG. 2). The charging roller 32, the developing device 40, a transfer roller 62, and a cleaning blade 34 are provided around the photoconductor drum 31 in that order in the direction of rotation of the photoconductor drum 31. The charging roller 32 is provided with a cleaning roller 33 that cleans the surface of the charging roller 32 by being in contact therewith.

The developing device 40 includes a developing-device housing 41 that contains developer. The developing-device housing 41 houses the developing roller 42 that faces the photoconductor drum 31 and rotates when driven via the coupling mechanism 100 (see FIG. 2). The developing-device housing 41 further houses a pair of augers 44 and 45 that stir the developer and transport the developer toward the developing roller 42. A layer-thickness-regulating roller 46 that regulates the thickness of a developer layer to be formed on the developing roller 42 is provided in proximity to the developing roller 42.

The exposure device 50 includes plural light-emitting diodes (LEDs) that are linearly aligned in a scanning direction and thus form an LED head. The exposure device 50 exposes the surface of the photoconductor drum 31 to light modulated in accordance with data on an image to be formed.

The exposure device 50 is movable by the retracting mechanism 80 with respect to the body of the image forming apparatus 1 (hereinafter referred to as "apparatus body") while being held by a holding member 51. In conjunction with the opening/closing of the openable/closable covering 1a, the exposure device 50 is moved between an exposure position where the exposure device 50 applies the modulated light to the photoconductor drum 31 and a retracted position where the exposure device 50 is spaced apart from the photoconductor drum 31.

The surface of the photoconductor drum 31 that is rotating is charged by the charging roller 32. An electrostatic latent image is formed on the charged surface of the photoconductor drum 31 by the exposure device 50. The electrostatic latent image on the photoconductor drum 31 is developed into a toner image by the developing roller 42.

The transfer device 60 includes the transfer roller 62 and the rear covering 1b that supports the transfer roller 62 such that the transfer roller 62 is movable to and away from the photoconductor drum 31. When the transfer roller 62 is in contact with the photoconductor drum 31, a nip is formed between the two. The power supply device 14 controlled by the image-forming-apparatus controller 11 applies a transfer voltage to the transfer roller 62, whereby the toner image on the photoconductor drum 31 is transferred to a sheet P passing through the nip between the photoconductor drum 31 and the transfer roller 62.

Toner particles that remain on the surface of the photoconductor drum 31 are removed by the cleaning blade 34 and are collected to the unit housing 35 that supports the photoconductor drum 31. Then, the surface of the photoconductor drum 31 is charged by the charging roller 32 again. Any substances failed to be removed by the cleaning blade 34 and adhered to the charging roller 32 are caught by and temporarily accumulated on the surface of the cleaning roller 33 that rotates while being in contact with the charging roller 32.

The fixing device 70 includes a pair of heating module 71 and a pressing module 72 that are pressed against each other and thus form a fixing nip (fixing area) therebetween.

The sheet P having the toner image transferred thereto by the transfer roller 62 is transported to the fixing device 70 along a transport guide (not illustrated) with the toner image unfixed. The sheet P transported to the fixing device 70 is heated and pressed by the pair of heating module 71 and the pressing module 72 and is thus fixed. The sheet P now having the fixed toner image is discharged by a pair of discharge rollers 74 onto the upper covering 1c at the top of the image forming apparatus 1.

(2) Configuration and Operation of Coupling Mechanism

Figure 3:
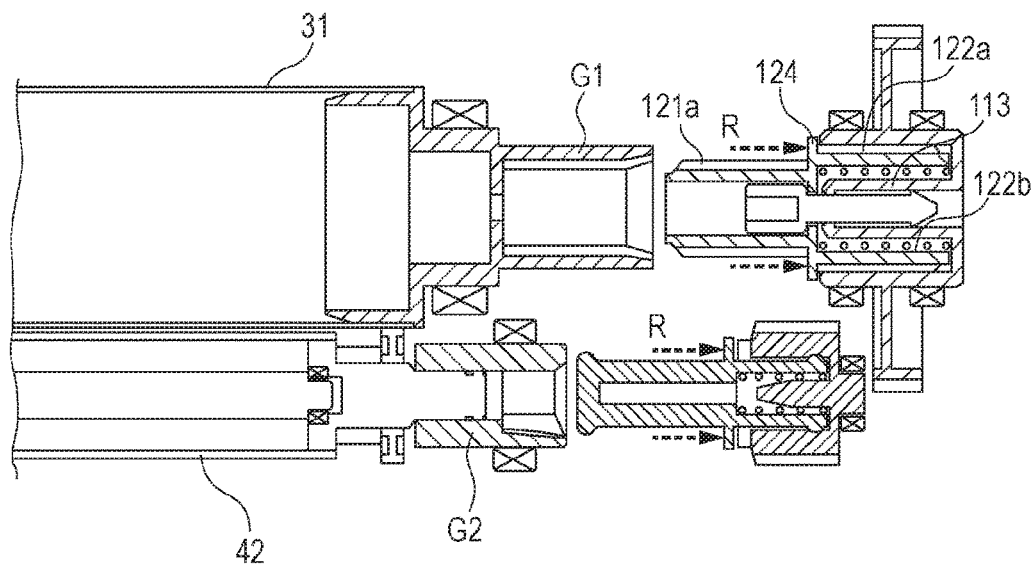
FIG. 3 is a schematic sectional view of the coupling mechanism that has been retracted from the photoconductor drum and from the developing roller.
Figure 4:
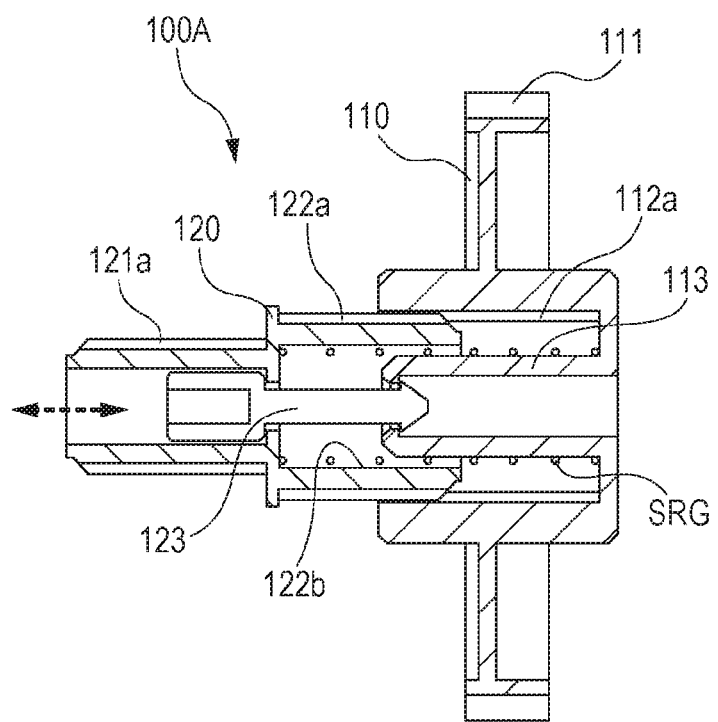
FIG. 4 is a sectional view of a first coupling.
Figure 5A:
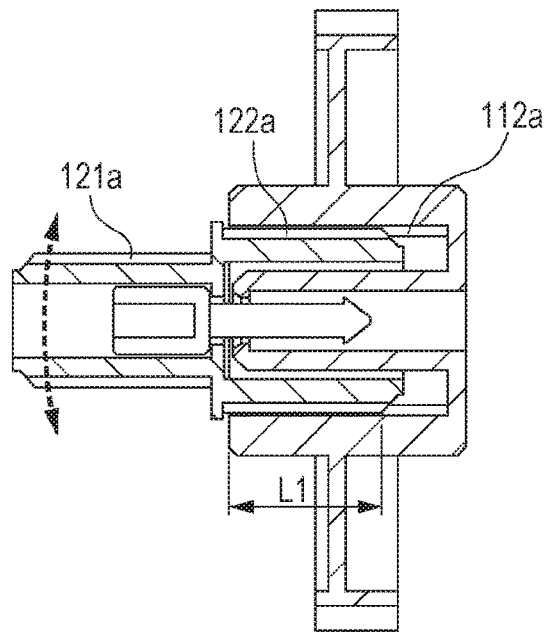
FIGS. 5A and 5B are schematic sectional views of the first coupling and illustrate an aligning function thereof.
Figure 5B:
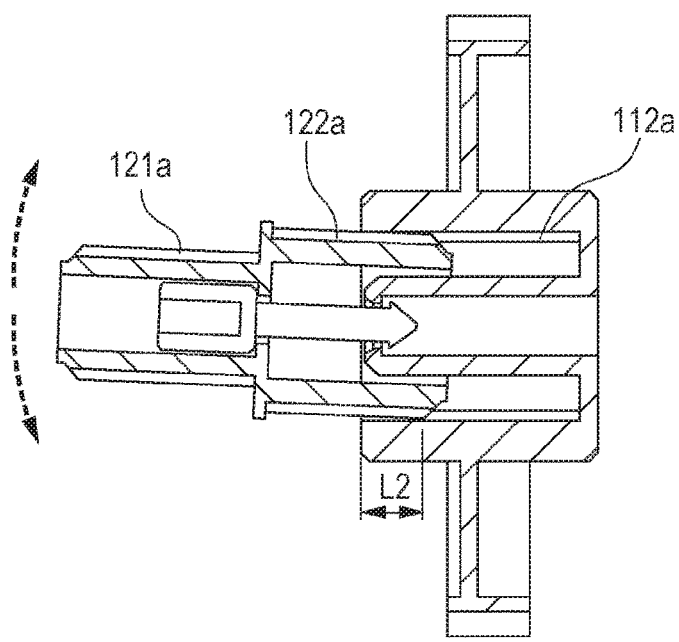

FIG. 2 is a schematic sectional view of the coupling mechanism 100 that transmits rotational driving forces to the photoconductor drum 31 and to the developing roller 42. FIG. 3 is a schematic sectional view of the coupling mechanism 100 that has been retracted from the photoconductor drum 31 and from the developing roller 42. FIG. 4 is a sectional view of a first coupling 100A. FIGS. 5A and 5B are schematic sectional views of the first coupling 100A and illustrate an aligning function thereof.

Now, the configuration and operation of the coupling mechanism 100 will be described with reference to FIGS. 2 to 5.

(2.1) Attaching/Detaching of Photoconductor Unit and Developing Device

The photoconductor unit 30 and the developing device 40 are combined as a process unit that is attachable to and detachable from the apparatus body through an opening provided in the apparatus body. The opening is covered by the openable/closable covering 1a. The apparatus body is provided with guide rails (not illustrated) extending between the opening and the position to which the process unit is attached. The photoconductor unit 30 and the developing device 40 are attached to or detached from the apparatus body along the guide rails.

The exposure device 50 that is at the exposure position is in proximity to the photoconductor unit 30 that is set in the apparatus body. Therefore, when the openable/closable covering 1a is opened so that the photoconductor unit 30 and the developing device 40 are attached to or detached from the apparatus body, the exposure device 50 is moved to the retracted position that does not interfere with the loci of the photoconductor unit 30 and the developing device 40 that are attached to or detached from the apparatus body.

When the openable/closable covering 1a is opened, the coupling mechanism 100 is also retracted from the photoconductor unit 30 and from the developing device 40, whereby the transmission of the rotational driving forces to the photoconductor unit 30 and to the developing device 40 is disabled.

(2.2) Configuration of Coupling Mechanism

Referring to FIG. 2 (in which rotary supporting portions BR are illustrated schematically), the coupling mechanism 100 includes the first coupling 100A and a second coupling 100B. The first coupling 100A transmits a rotational driving force generated by a drive source (not illustrated) to the photoconductor drum 31, which is an exemplary driving object. The second coupling 100B transmits a rotational driving force generated by a drive source (not illustrated) to the developing roller 42.

The second coupling 100B serves as a ball-joint mechanism that joins a second output gear 130 and a developing-roller gear G2 to each other. The second output gear 130 is driven by the drive source via plural gears. The developing-roller gear G2 is fixed to the developing roller 42. The second coupling 100B smoothly transmits the rotational driving force to the developing roller 42 that is set in the apparatus body and rotates while being in contact with the photoconductor drum 31.

The first coupling 100A includes a first output gear 110 and a transmitting member 120. The first output gear 110 is driven by the drive source via plural gears. The transmitting member 120 retractably meshes with the first output gear 110 and transmits the rotational driving force to the photoconductor drum 31 as a driving object.

The first output gear 110 includes external teeth 111, internal teeth 112, and a guiding portion 113. The external teeth 111 receive the rotational driving force that is inputted to the first output gear 110. The internal teeth 112 mesh with the transmitting member 120 and transmit the rotational driving force to the transmitting member 120. The guiding portion 113 guides the advancing/retracting movement of the transmitting member 120.

The transmitting member 120 includes a first transmitting portion 121 and a second transmitting portion 122 having a larger diameter than the first transmitting portion 121. The first transmitting portion 121 meshes with a flange gear G1 that is fixed to an end of the photoconductor drum 31.

The first transmitting portion 121 has first involute spline teeth 121a provided on the outer circumference thereof and that mesh with involute spline teeth provided on the inner circumference of the flange gear G1. The second transmitting portion 122 has second involute spline teeth 122a provided on the outer circumference thereof. The number of second involute spline teeth 122a is the same as the number of first involute spline teeth 121a.

The internal teeth 112 of the first output gear 110 serve as third involute spline teeth 112a that mesh with the second involute spline teeth 122a.

In the present exemplary embodiment, the first transmitting portion 121 has the first involute spline teeth 121a defined by a module of 0.6 and a number of teeth of 18, and the second transmitting portion 122 has the second involute spline teeth 122a defined by a module of 0.8 and a number of teeth of 18.

Referring to FIG. 4, the transmitting member 120 is supported in such a manner as to be capable of advancing toward and retracting from the photoconductor drum 31 in the axial direction of the photoconductor drum 31, with the second involute spline teeth 122a thereof being in mesh with the third involute spline teeth 112a of the first output gear 110 and with an inner surface 122b of the second transmitting portion 122 being guided by the guiding portion 113.

The transmitting member 120 is urged toward the flange gear G1 of the photoconductor drum 31 by an urging member SRG. A locking member 123 is provided between the transmitting member 120 and the first output gear 110 and limits the movement of the transmitting member 120 toward the flange gear G1.

The first coupling 100A configured as described above serves as an involute spline coupling in which the transmitting member 120 is connected to the flange gear G1 of the photoconductor drum 31 of the photoconductor unit 30 that is set in the apparatus body. Thus, the first coupling 100A transmits the rotational driving force from the drive source to the photoconductor drum 31.

Such an involute spline coupling structurally provides a superior aligning function. Even if the flange gear G1 and the transmitting member 120 are misaligned with each other in attaching the photoconductor unit 30 to the apparatus body, the involute spline coupling absorbs the misalignment and enables the transmission of the rotational driving force.

FIGS. 5A and 5B schematically illustrate the aligning function of the first coupling 100A. The addendum modification coefficients of the second involute spline teeth 122a and the third involute spline teeth 112a are set such that a backlash is provided therebetween.

In a state illustrated in FIG. 5B where the transmitting member 120 is pushed out toward the flange gear G1 of the photoconductor drum 31, the length of meshing between the second involute spline teeth 122a and the third involute spline teeth 112a of the first output gear 110 is short (as denoted by L2 in FIG. 5B). Accordingly, the length of movement of the transmitting member 120 in the radial direction is large. Therefore, even if the flange gear G1 and the transmitting member 120 are misaligned with each other, the misalignment is absorbed easily and the transmission of the rotational driving force is enabled.

On the other hand, in a state illustrated in FIG. 5A where the transmitting member 120 of the first coupling 100A serving as the involute spline coupling has been retracted from the flange gear G1 of the photoconductor drum 31, the length of meshing between the second involute spline teeth 122a and the third involute spline teeth 112a of the first output gear 110 is long (as denoted by L1 in FIG. 5A). Accordingly, the length of movement of the transmitting member 120 in the radial direction is small. Therefore, the transmitting member 120 tends to be well aligned with the flange gear G1 and is easily brought into mesh with the flange gear G1.

The size of the backlash is adjustable by appropriately setting the addendum modification coefficients of the second involute spline teeth 122a and the third involute spline teeth 112a.

FIG. 3 illustrates a state where the coupling mechanism 100 has been retracted and disconnected from the photoconductor unit 30 and from the developing device 40 so as to allow the photoconductor unit 30 and the developing device 40 to be attached to or detached from the apparatus body.

To disconnect the coupling mechanism 100 from the photoconductor unit 30 and the developing device 40, a flange portion 124 provided between the first transmitting portion 121 and the second transmitting portion 122 of the transmitting member 120 is pushed by, for example, a swash plate cam (not illustrated) that is configured to move (as illustrated by an arrow R in FIG. 3) in conjunction with the opening/closing of the openable/closable covering 1a, whereby the coupling mechanism 100 is moved to the retracted position. Thus, the first involute spline teeth 121a of the transmitting member 120 that have been in mesh with the flange gear G1 is disconnected from the flange gear G1.

The transmitting member 120 of the first coupling 100A is supported in such a manner as to be capable of advancing toward and retracting from the photoconductor drum 31 in the axial direction of the photoconductor drum 31, with the second involute spline teeth 122a being in mesh with the third involute spline teeth 112a of the first output gear 110 and with the inner surface 122b of the second transmitting portion 122 being guided by the guiding portion 113.

Therefore, the guiding portion 113 prevents the transmitting member 120 from tilting with respect to the direction in which the transmitting member 120 advances or retracts. Consequently, rubbing of the transmitting member 120 against the flange gear G1 that may occur when the coupling mechanism 100 is moved to the retracted position is suppressed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an output gear configured to be driven by a drive source;
   a transmitting member that meshes teeth with the output gear, wherein the transmitting member is configured to advance toward and retract from a driving object and to transmit a rotational driving force to the driving object;

a guiding portion provided coaxially with the output gear, wherein the guiding portion is configured to guide the transmitting member in a direction of advancement or retraction of the transmitting member; and a locking member provided between the output gear and the transmitting member, the locking member is configured to limit a movement of the transmitting member from a side of the output gear toward the driving object.

2. The image forming apparatus according to claim 1, wherein the transmitting member includes:

a first transmitting portion having first involute spline teeth provided on an outer circumference of the first transmitting portion, the first involute spline teeth meshing with other involute spline teeth provided on an inner circumference of the driving object; and a second transmitting portion having a larger diameter than the first transmitting portion and having second involute spline teeth that are provided on an outer circumference of the second transmitting portion, the second involute spline teeth being provided in a same number of teeth as the first involute spline teeth, wherein the second transmitting portion has a guided surface provided on an inner side of the second transmitting portion, the guided surface facing and being guided along an outer circumferential surface of the guiding portion.

3. The image forming apparatus according to claim 1, wherein the output gear has third involute spline teeth provided on an inner circumference of the output gear and that mesh with the second involute spline teeth, wherein second involute spline teeth and the third involute spline teeth mesh with each other with a backlash provided in a radial direction, and wherein a length of movement of the transmitting member in the radial direction increases with a length of projection of the transmitting member toward the driving object.

4. The image forming apparatus according to claim 1, wherein the driving object is a photoconductor drum.

5. The image forming apparatus according to claim 1, wherein the locking member extends from an inside of the transmitting member to an outside of the transmitting member.

6. An image forming apparatus comprising:

an output gear configured to be driven by a drive source;

a transmitting member that meshes with the output gear, wherein the transmitting member is configured to advance toward and retract from a driving object and to transmit a rotational driving force to the driving object;

a guiding portion provided coaxially with the output gear, wherein the guiding member is configured to guide the transmitting member in a direction of advancement or retraction of the transmitting member; and a locking member provided between the output gear and the transmitting member, wherein the locking member is configured to limit a movement of the transmitting member from a side of the output gear toward the driving object, wherein wherein the transmitting member includes:

a first transmitting portion having first involute spline teeth provided on an outer circumference of the first transmitting portion, the first involute spline teeth meshing with other involute spline teeth provided on an inner circumference of the driving object; and a second transmitting portion having a larger diameter than the first transmitting portion and having second involute spline teeth that are provided on an outer circumference of the second transmitting portion, the second involute spline teeth being provided in a same number of teeth as the first involute spline teeth, wherein the second transmitting portion has a guided surface provided on an inner side of the second transmitting portion, the guided surface facing and being guided along an outer circumferential surface of the guiding portion.

7. An image forming apparatus comprising:

an output gear configured to be driven by a drive source;

a transmitting member that meshes with the output gear, wherein the transmitting member is configured to advance toward and retract from a driving object and to transmit a rotational driving force to the driving object;

a guiding portion provided coaxially with the output gear, wherein the guiding portion is configured to guide the transmitting member in a direction of advancement or retraction of the transmitting member; and a locking member provided between the output gear and the transmitting member, wherein the locking member is configured to limit a movement of the transmitting member from a side of the output gear toward the driving object, wherein the output gear has third involute spline teeth provided on an inner circumference of the output gear and that mesh with the second involute spline teeth, wherein second involute spline teeth and the third involute spline teeth mesh with each other with a backlash provided in a radial direction, and wherein a length of movement of the transmitting member in the radial direction increases with a length of projection of the transmitting member toward the driving object.

8. An image forming apparatus comprising:

an output gear configured to be driven by a drive source;

first involute spline teeth that mesh with the output gear, wherein the first involute spline teeth are configured to advance toward and retract from a driving object and to transmit a rotational driving force to the driving object;

an inner cylinder of the output gear provided coaxially with the output gear and is configured to guide the first involute spline teeth in a direction of advancement or retraction of the first involute spline teeth; and a bolt provided between the output gear and the cylinder, the bolt is configured to limit a movement of the first involute spline teeth from a side of the output gear toward the driving object.

* * * * *